US011787320B2

(12) United States Patent
Gasko et al.

(10) Patent No.: US 11,787,320 B2
(45) Date of Patent: Oct. 17, 2023

(54) SEAT BACK PANEL

(71) Applicant: Adient US LLC, Plymouth, MI (US)

(72) Inventors: Joseph Gasko, Commerce Township, MI (US); Reinier Soliven, Oakland, MI (US); John Gomez, Howell, MI (US)

(73) Assignee: Adient US LLC, Plymouth, MI (US)

( * ) Notice: Subject to any disclaimer, the term of this patent is extended or adjusted under 35 U.S.C. 154(b) by 39 days.

(21) Appl. No.: 17/645,078

(22) Filed: Dec. 20, 2021

(65) Prior Publication Data
US 2022/0212581 A1 Jul. 7, 2022

Related U.S. Application Data

(60) Provisional application No. 63/134,211, filed on Jan. 6, 2021.

(51) Int. Cl.
*B60N 2/68* (2006.01)
*B60N 2/60* (2006.01)

(52) U.S. Cl.
CPC ........... *B60N 2/686* (2013.01); *B60N 2/6009* (2013.01); *B60N 2/682* (2013.01)

(58) Field of Classification Search
CPC ........ B60N 2/686; B60N 2/6009; B60N 2/60; B60N 2/682; B60R 7/043; B60R 2011/0015; B60R 11/0235
See application file for complete search history.

(56) References Cited

U.S. PATENT DOCUMENTS

| 5,292,174 | A | * | 3/1994 | Ohnuma | ................. | B60R 7/043 |
| | | | | | | 297/188.06 |
| 9,440,568 | B2 | * | 9/2016 | Hong | ................... | B60N 2/6009 |
| 10,308,203 | B2 | * | 6/2019 | Matusko | .................. | B60N 2/24 |
| 10,414,343 | B2 | * | 9/2019 | Shrewsbury | ............ | B60R 7/043 |
| 10,730,417 | B2 | * | 8/2020 | Inoue | ..................... | B60N 2/609 |
| 10,773,616 | B2 | * | 9/2020 | Wlassuk | .............. | B60N 2/6009 |
| 10,926,681 | B2 | * | 2/2021 | Yu | ........................ | B60N 2/6009 |
| 2009/0089841 | A1 | * | 4/2009 | Hanlon | ............... | B60R 11/0235 |
| | | | | | | 725/75 |
| 2017/0282759 | A1 | * | 10/2017 | Line | ..................... | B60N 2/4228 |

* cited by examiner

*Primary Examiner* — David R Dunn
*Assistant Examiner* — Tania Abraham
(74) *Attorney, Agent, or Firm* — Adient US LLC

(57) ABSTRACT

A seat back panel may have a panel having a central portion bounded by an upper portion and a lower portion. The upper portion may have an upper attachment member adapted to selectively receive a portion of a framework for a seat. The central portion may have a least one side attachment member adapted to selectively receive a portion of the framework. the central portion may have a concave shape. The lower portion may have a convex shape. The concave shape and the convex shape may give the panel a general S-shape.

14 Claims, 4 Drawing Sheets

SEAT BACK PANEL

FIELD

One embodiment of a back panel for a seat, such as for a seat in a vehicle, including but not limited to a passenger-type vehicle, like a car or truck, is disclosed. The seat may have applicability in other vehicles as well.

BACKGROUND

Vehicles, including passenger-type vehicles, include seats for occupants. The seats typically have a lower cushion portion and a back portion. The back portion may have a framework that connects with a framework in the lower cushion portion; often the back portion is connected in a pivoting fashion to the lower cushion portion. The framework of the lower cushion portion may be attached to the frame of the vehicle.

Mechanical devices, such as mechanisms to adjust portions of the seat, including but not limited to, the bolster, headrest and/or cushions (e.g., seat tilt, seat angle, and/or seat height) may be attached to the framework of either the lower cushion portion or the back portion.

The frameworks of the back portion and the cushion portion may be provided, at least in part, with cushioning material to make them more comfortable to sit on. A covering, which may be a fabric material, may extend at least partially over the cushioning material to enclose it and provide the seat with an aesthetically pleasing appearance. The covering also extends over the frameworks and the mechanical devices. Often the covering is somewhat permanent in nature in that it has to be at least partially destroyed to reach the interior of the seat once the covering is in place.

It can be appreciated from the foregoing that enclosing the seat with fabric, or using other materials to enclose the seat, can make accessing the interior of the seat difficult such as during assembly and for repair. Zippers or the like may be used to access the interior of the seat but the zippers and/or their coverings are often unsightly and in the way of easy access to other seat back components and attachments. Some coverings also fix the profile of the seat, which can reduce available space, such as leg room space for adjacent occupants.

In view of the disadvantages associated with the prior art designs, it would be advantageous for a seat to have at least a partial modular construction so that portions of the seat can be easily accessed during assembly or for repair. It would also be advantageous for the modular features to attach, or connect, to existing seat structures. It would also be advantageous for at least a portion of the seat to have the option to flex into the seat to provide additional leg room for adjacent occupants. Further, it would be advantageous for the seat to provide the above features in a low cost and easy to manufacture method.

SUMMARY

In one embodiment, a seat back panel may have a panel having a central portion bounded by an upper portion and a lower portion. The upper portion may have an upper attachment member adapted to selectively receive a portion of a framework for a seat. The central portion may have a least one side attachment member adapted to selectively receive a portion of the framework. The central portion may have a concave shape. The lower portion may have a convex shape. The concave shape and the convex shape may give the panel a general S-shape.

In another aspect, the panel may be constructed of an elastic polymeric material.

In another aspect, the panel may have a thickness between approximately 1.2 to 2.5 mm.

In another aspect, the upper attachment member may have a mounting surface directly attached to an inner surface of the upper portion of the panel.

In another aspect, a flange of the upper attachment member may extend generally transverse the mounting surface.

In another aspect, a first rear finger may extend generally transversely from the flange, and a second forward finger may extend generally transversely from the flange, where the first rear finger and the second forward finger may be generally parallel one another.

In another aspect, the second forward finger may have a bend adapted to create a capture surface for the framework.

In another aspect, the at least one side attachment member may have a general I-shaped cross-section.

In another aspect, the I-shaped cross-section may be formed from an inner mounting surface, a central flange portion and a base.

In another aspect, the central flange portion may extend generally transversely the inner surface of the panel.

In another aspect, the base may have an angled interior edge portion to create a hook-like structure with the central flange portion.

In another aspect, the first and second side attachment members may be located on opposite sides of the central portion.

In another aspect, the at least one side attachment member and the upper attachment member may be adapted to elastically selectively receive and secure the framework.

In another aspect, the lower portion may have wing portions that are located below the central portion, the wing portions may have a greater width than the central portion.

In another aspect, the panel may be unitary, integrally formed and one piece.

In another aspect, the seat back panel may be unitary, integrally formed and one piece.

In another aspect, a seat back panel may have a panel having a central portion bounded by an upper portion and a lower portion. The central portion may have a least one side attachment member adapted to selectively receive a portion of the framework. The central portion may have a concave shape. The lower portion may have a convex shape. The concave shape and the convex shape may give the panel a general S-shape.

BRIEF DESCRIPTION OF THE DRAWINGS

The above, as well as other advantages, will become readily apparent to those skilled in the art from the following detailed description when considered in the light of the accompanying drawings in which.

DETAILED DESCRIPTION

It is to be understood that the device may assume various alternative orientations and step sequences, except where expressly specified to the contrary. It is also to be understood that the specific devices and processes illustrated in the attached drawings, and described in the following specification are simply exemplary embodiments. Hence, specific dimensions, directions or other physical characteristics relating to the embodiments disclosed are not to be considered as limiting, unless the expressly stated otherwise.

Figure 1:
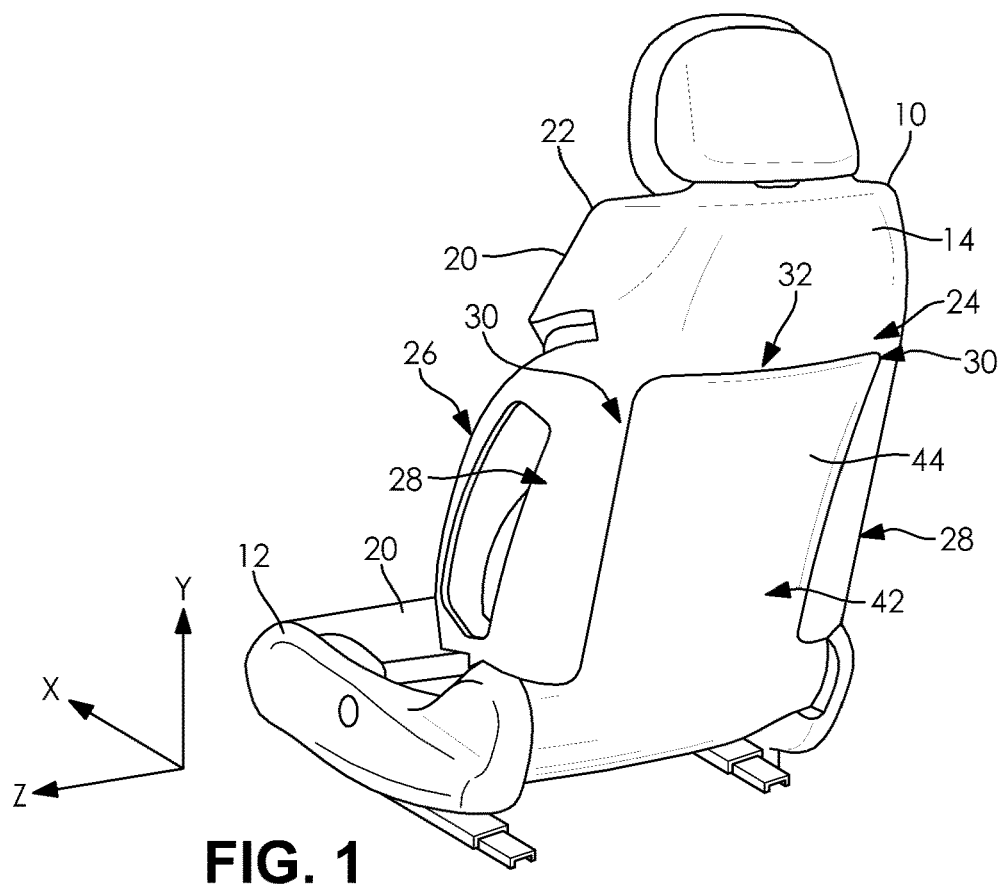
FIG. 1 depicts one embodiment of a rear perspective view of a seat with a back panel located therein.

Turning now to the figures, one embodiment of a seat 10, such as a seat 10 that might be used in a vehicle, is depicted in FIG. 1. The seat 10 in FIG. 1 schematically depicts a lower cushion portion 12 and a back portion 14 connected to the lower cushion portion 12. The lower cushion portion 12 may have a framework 16, and the back portion may have a framework 18, which are partially and schematically depicted in FIGS. 4-7. The frameworks 16, 18 provide a relatively rigid structure for the seat 10. In the case of the lower cushion portion 12, its framework 16 may provide an attachment point to the vehicle. The framework 18 for the back portion 14 may be connected to the framework 16 for the lower cushion portion 12. In some embodiments, the connections between the frameworks 16, 18 and/or the vehicle may allow for selective pivotal motion, or relative forward and rear motion of the seat 10. Forward and/or rear motion may be such as along an x-axis, as shown in the figures.

The seat 10 may contain mechanical devices, such as mechanisms to adjust the seat. The mechanisms may be used to adjust the tilt, height, and/or position of the seat 10 and its components, and/or the operation of the seat 10. These devices are not depicted in the figures.

Figure 7:
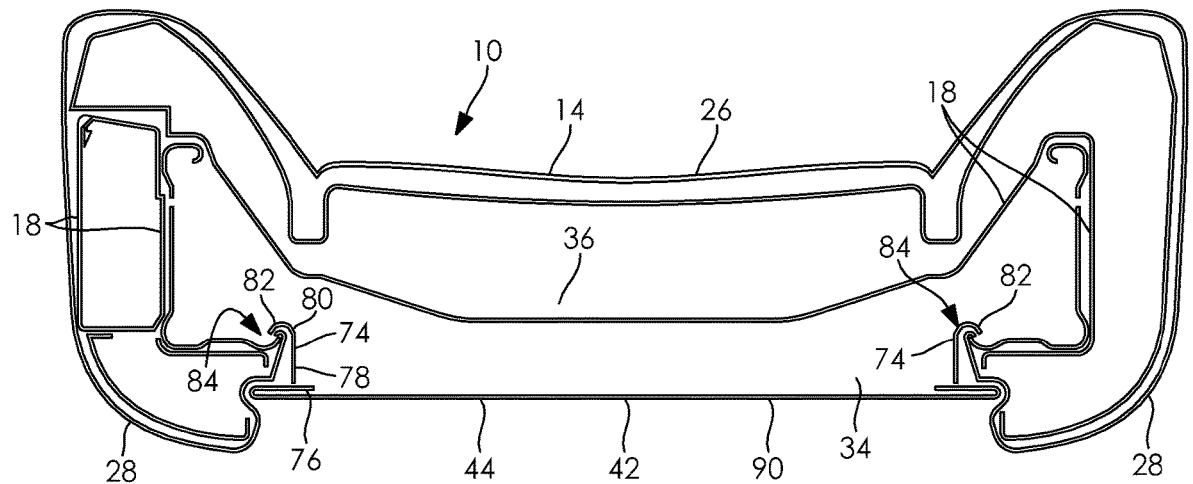
FIG. 7 depicts a partial cut-away top view of a seat back and a back panel.

The frameworks 16, 18 of the back portion 14 and the lower cushion portion 12 may be provided, at least in part, with cushioning material 20 to make them more comfortable to sit on. The cushioning material 20 may also provide shape to the seat 10. A covering 22, which may be a fabric material, may extend at least partially over the cushioning material 20 to enclose it and provide the seat 10 with an aesthetically pleasing appearance. The covering 22 also extends over the frameworks 16, 18 and the mechanical devices. The figures, such as FIG. 7, depict one embodiment of the cushioning material 20 and covering 22.

Figure 2:
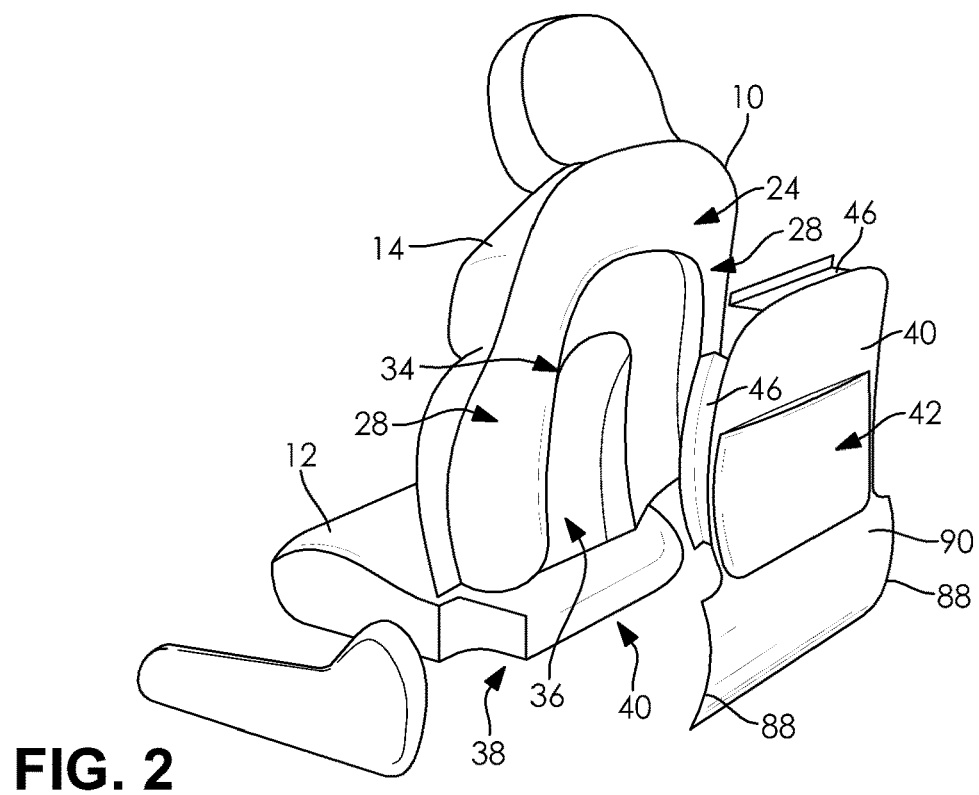
FIG. 2 depicts a seat with a back panel exploded therefrom.

The back portion 14 has a rear portion 24, or a portion which faces away from a forward direction, such as long the x direction, of the vehicle in which the seat 10 is located. The rear portion 24 may be located on an opposite side of the seat 10 from where a seat occupant may reside on the seat 10. Where an occupant may reside might be designated as a forward portion 26 of the seat 10. The rear portion 24 may have two generally parallel side portions 28 connected at their upper portions 30 by a top portion 32. The side portions 28 may generally have their primary extension along a y-axis. The top portion 32 may generally extend transverse the side portions 28. The rear portion 24, through the side portions 28 and the top portion 32, may define a generally U-shape, as shown in FIG. 2. The side portions 28 and top portion 32 may further define an opening 34 that extends into an interior portion 36 of the seat 10.

In some cases, the opening 34 in the seat 10 provides access to the interior 36 of the seat 10, including the frameworks 16, 18 and the mechanical devices, as well as other features of the seat 10. This access may be helpful during construction, installation and/or repair of the seat 10 and its components.

Figure 4:
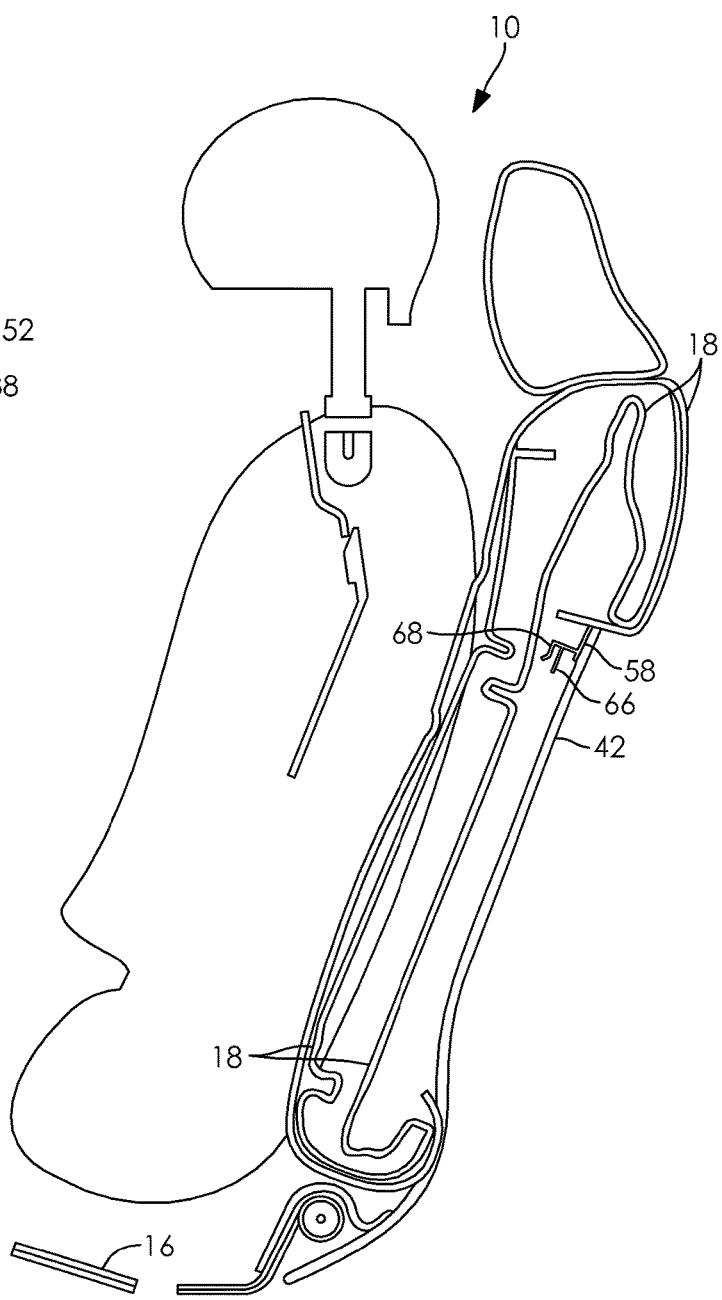
FIG. 4 depicts a partial cut-away side view of one embodiment of cushioning material, framework and a back panel.
Figure 5:
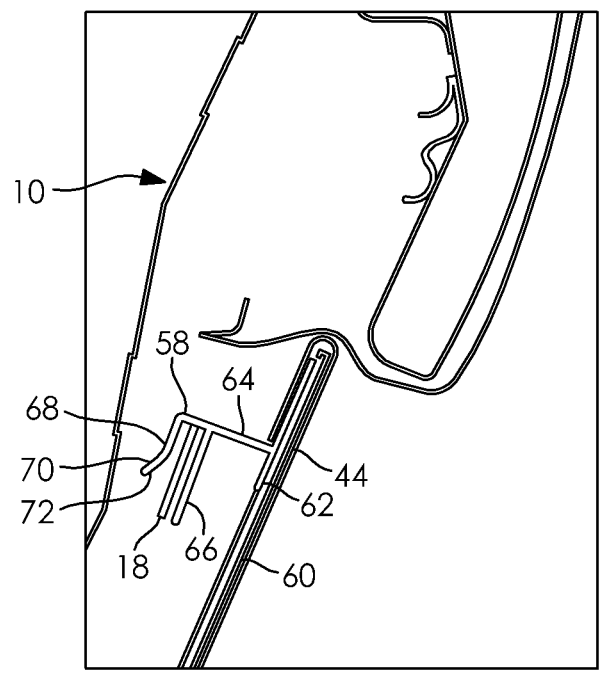
FIG. 5 depicts a partial cut-away side view of an upper portion of a seat back and back panel.
Figure 6:
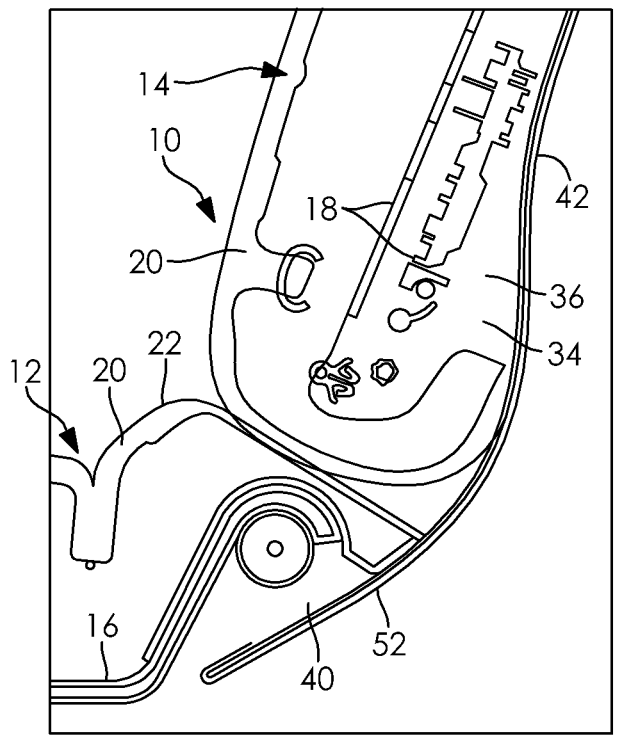
FIG. 6 depicts a partial cut-away side view of a lower portion of a seat back and a back panel.

In some cases, the cushion portion 12 may also have a rear portion 38, or a portion which faces away from the forward direction of the vehicle in which the seat 10 is located. In some cases, as shown in FIG. 4, the rear portion 38 of the lower cushion portion 12 provides access to the interior 36 of the seat 10, including the framework and the mechanical devices, as well as other features of the seat. This access may be provided such as through an opening 34 in the rear portion 38, similar to that described above.

In many cases, it may be preferred to close, or enclose, the rear portion 38 of the lower cushion portion 12 and the rear portion 24 of the back portion 14. It may also be preferred that the closure or enclosure is done selectively, or in a non-permanent fashion, so that access the rear portions 24, 28 is still available.

A seat back panel 42, one embodiment of which shown in the figures, may be selectively attached to the cushion portion 12 and/or back portion 14 to close or enclose any or all of the above-noted openings 34, 40.

The seat back panel 42 may be comprised of a panel 44 and one more attachment members 46, or other fastening devices, that may be used to attach the panel 42 to the seat 10, such as the rear portion 24. The attachment members 46 may include, but are not limited to, mechanical fasteners, male/female couplings, hook and loop fasteners and/or adhesives. The attachment member 46 may be attached to, or be part of, the panel 44, thus making the seat back panel 42 modular in nature. The attachment member 46 may also be extruded from a material and then attached to the panel 44.

In some embodiments, the seat back panel 42 may have a one piece, unitary and integrally formed construction. The seat back panel 42 may be constructed of a polymeric material, such as plastic, but other materials may be permissible.

In one embodiment, the panel 44 may be die cut from a sheet of material. This provides the advantage that the panel 44 can be created without expensive tools or molds, and the panel 44 can be produced quickly and easily.

In some cases, the panel 44 may have a thickness between approximately 1.0 mm to 2.5 mm. The panel 44 thickness may be constant across the entire panel 44, or the thickness may vary in the noted range.

A panel 44 constructed of polymeric material in the noted thickness range may be generally flexible and elastically deformable. This is advantageous as the panel 44, when located onto the back portion 14 of the seat 10, can be selectively flexed into the opening(s) 34 and/or 40, such as by the knees of a rear occupant, in order to provide additional leg/knee room. The elastic nature of the panel 44 permits it to rebound into its original shape and position when a flexing force is removed from the panel 44.

The panel 44 may have a central portion 48 bounded by an upper portion 50 and a lower portion 52. First and second side portions 54, 56, extending generally transverse the upper and lower portions 50, 52, may further bound the panel 44. The upper, central and/or side portions 50, 48, 54, 56 may have a generally concave shape, such as extending in the x direction, which can be appreciated from FIGS. 2 and 3.

Figure 3:
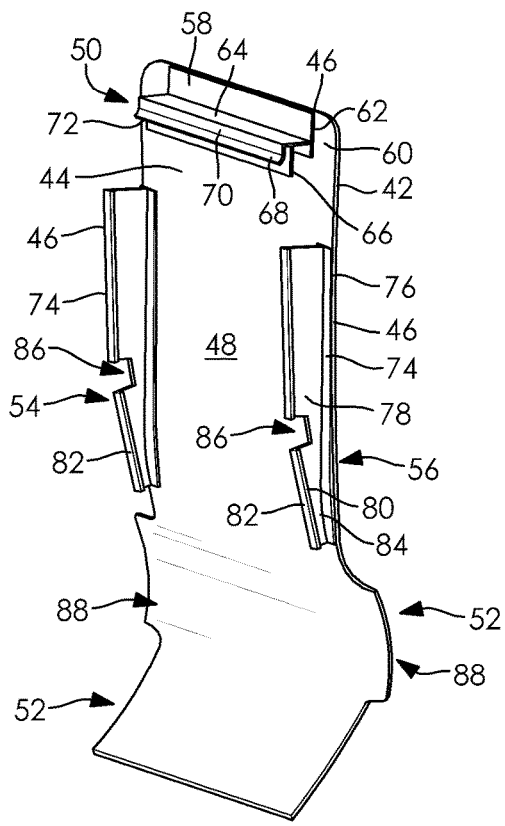
FIG. 3 depicts a perspective view of one embodiment of a back panel.

In some embodiments, the upper portion 50 may have an upper attachment member 58 attached to an inner surface 60 of the panel 44, such as shown in FIGS. 2 and 3. The upper attachment member 58 may be attached to the panel 44 such as through mechanical fasteners, male/female couplings, hook and loop fasteners and/or adhesives. The upper attachment member 58 may also be one piece, integrally formed and unitary with the panel 44.

The upper attachment member 58 may have a mounting surface 62 that attaches, or connects, directly with the inner surface 60. The upper attachment member 58 may also have a flange 64 that may extend at an angle, such as generally perpendicularly, to the mounting surface 62. The flange 64 extends away from the inner surface 60.

In some embodiments, two fingers may extend downwardly from the flange 64. A first, rear finger 66 may extend at an angle, such as generally perpendicularly, to the flange 64 so that it extends generally parallel the inner surface 60 of the panel 44. A second, forward finger 68 may extend at an angle from the flange 64 so it is also generally parallel the inner surface 60 and the first, rear finger 66. A portion of the second, forward finger 68, however, may have a bend 70 in it. The bend 70 may create a capture surface 72 adapted to selectively capture and retain a framework 18 member of the back portion 14 therein, which may be appreciated from the embodiment shown in FIG. 5. In some embodiments, the framework 18 of the back portion 14 may be located between the second, forward finger 68 and the first, rear finger 66 with the bend 70 helping to at least initially capture the framework 18 by providing a wider opening compared with the space between the two fingers 66, 68.

Figure 8:
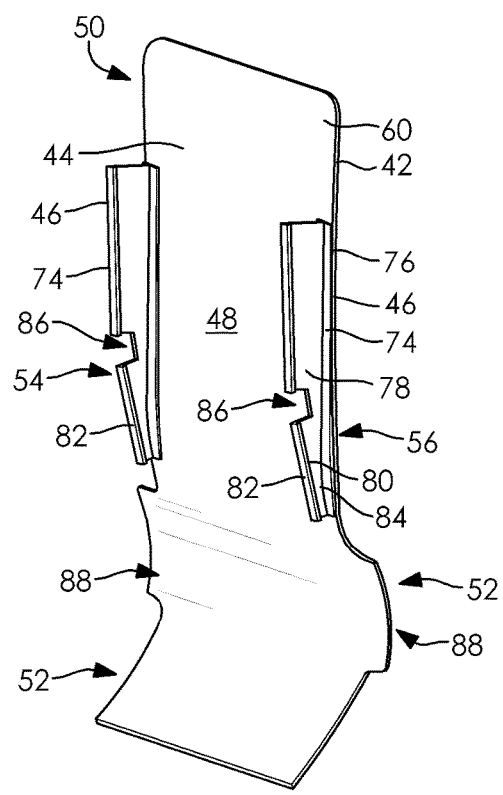
FIG. 8 depicts a perspective view of one embodiment of a back panel.

In other embodiments, the upper attachment member 58 may be such as a strap, tie, hook and/or other similar structure to connect the panel 44 with the framework 18. These upper attachment members 58 may be used with the above-mentioned structure, or on their own. In other embodiments, the panel 44 may not have any upper attachment member, as shown in FIG. 8.

One or more side attachment members 74 may be attached to the side portions 54, 56 of the panel 44, one embodiment of which is shown in FIGS. 2 and 3. In some embodiments, each side attachment member 74 may have a generally I-shaped cross section formed by an inner mounting surface 76, a central flange portion 78 and a base 80. The inner mounting surface 76 may attach, or connect, directly to the inner surface 60 of the panel 44. The inner mounting surface 76 may be connected to the panel 44 such as through mechanical fasteners, male/female couplings, hook and loop fasteners and/or adhesives. The inner mounting surface 76 may be generally planar and/or parallel with the inner surface 60 of the panel 44.

The central flange portion 78 may extend at an angle, such as generally perpendicularly, substantially along the inner mounting surface 76. The base 80 may extend generally parallel to the inner mounting surface 76 substantially along the central flange portion 78. An interior edge portion 82 of the base 80 may be curved or angled, such as in an outward or outboard direction (which is in the z direction), to create a hook-like structure 84 with the central flange portion 78. The hook-like structures 84 are designed to selectively capture and retain the framework 18 of the back portion 14, one embodiment of which is shown in FIG. 7.

The side attachment members 74 may have portions 86 removed therefrom to accommodate seat structures and/or framework 18 of the back portion 18. The portions 86 may be such as rectangular shaped areas where material has been removed from the side attachment members 74.

The side attachment members 74 may be substantially the same as one another, or they may be different from one another. The side attachment members 74 may extend generally transverse the upper attachment member 58 on the seat back panel 42.

The upper attachment member 58 and the side attachment members 74 may be such as clip-like devices that selectively secure to the framework 18 of the back portion 14. The attachment members 58, 74 may be elastically deformable to achieve the clip-like function and/or they may be biased, such as through springs (e.g., leaf and/or coil type springs), to achieve the clip-like function. In some embodiments, the above-noted features of the individual attachment members 58, 74 may pressed or pinched together about any of the above-mentioned framework to secure the panel 44 to the framework 18. In such a case, when the attachment member features are released from being pinched/pressed, they maintain the pinched/pressed position to retain the framework 18.

It is permissible to use a cushioning material (not shown), such as foam, between the attachment members 58, 74 and the seat 10 to reduce relative movement of the attachment members 58, 74 and/or panel 44 with respect to the seat 10 and to reduce the potential for rattling.

In some embodiments, the sides of the panel 44 below the side attachment member 74 may widen to cover portions of the back portion 18 or the lower cushion portion 16 as needed, as shown in FIG. 3. These wing portions 88, compared with the rest of the panel 44, may have a greater outward dimension (or z direction) compared with the rest of the panel 44. In addition, as may be appreciated in FIGS. 2 and 3, the wing portions 88, including the portion of the panel 44 between them, may have a generally convex shape, such as extending in the x-direction.

The lower portion 52 of the panel 44, which may be part of the wing portions 88, may form a toe-kick-like feature for the panel 44 and seat 10, which can be appreciated from at least FIGS. 1, 2, 3, 4 and 6. The lower portion 52 of the panel 44 may extend from the central portion 48, which is generally positioned along the back portion 14 of the seat 10, so that the lower portion 52 wraps under the back portion 14 in a continuous curved fashion, and may extend to, or even under, a portion of the lower cushion portion 12. In this embodiment, the panel 44 selectively encloses the back portion 18 and the lower cushion portion 12 with a single piece, which eliminates the prior art structure of a separate toe kick structure and its attachment hardware. The lower portion 52 of the panel 44 prevents objects, including the feet/toes of rear passengers, from contacting the internal structures of the back portion 18 and the lower cushion portion 12.

The forward extending direction, or x direction, of the lower portion 52 of the panel 44, coupled with the convex wing portions 88 and the concave central portion 48, may provide the panel 44 with a general S-shape appearance such as when viewed from the side.

The panel 44 may start as flat stock material that has been die cut to the desired shape and size. The material may be such as polyvinyl chloride (PVC) or acrylonitrile butadiene styrene (ABS). The S-shape may be achieved before or after die cutting such as with thermos-forming.

In some embodiments, a covering (not shown) may be selectively located at least partially over an external surface of the panel. The covering may be to assist with the aesthetics of the panel and/or the covering may be functional in nature. For example, the covering may be in the form of one or more pockets 90 on the panel so that items can be stored therein. By way of further example, the covering may be carpeting, and/or a film with design, decoration or color thereon/therein.

From the above and the figures, it can be appreciated that the panel can be selectively and easily attached to and removed from the seat back portion as an entire module. In the installed condition, it provides an aesthetically pleasing closure, or covering, to the seat, while being highly cost effective. The panel can be removed to provide easy and quick access to the interior of the seat back portion and the seat cushion during manufacturing, assembly and/or later repair.

In accordance with the provisions of the patent statutes, the present device has been described in what is considered to represent its preferred embodiments. However, it should be noted that the invention can be practiced otherwise than as specifically illustrated and described without departing from its spirit or scope.

What is claimed is:

1. A seat back panel, comprising:
    a panel having a central portion bounded by an upper portion and a lower portion,
    wherein said upper portion has an upper attachment member adapted to selectively receive a portion of a framework for a seat;
    wherein said central portion has a least one side attachment member adapted to selectively receive a portion of said framework, said central portion having a concave shape,
    wherein said lower portion has a convex shape,
    wherein said concave shape and said convex shape give said panel a general S-shape,
    wherein said upper attachment member has a mounting surface directly attached to an inner surface of said upper portion of said panel,
    wherein a flange extends generally transverse said mounting surface,
    wherein a first rear finger extends generally transversely from said flange, and a second forward finger extends generally transversely from said flange, wherein said first rear finger and said second forward finger are generally parallel one another.

2. The seat back panel of claim 1, wherein said panel is constructed of an elastic polymeric material.

3. The seat back panel of claim 1, wherein said panel has a thickness between approximately 1.0 to 2.5 mm.

4. The seat back panel of claim 1, wherein said second forward finger has a bend adapted to create a capture surface for said framework.

5. The seat back panel of claim 1, wherein said at least one side attachment member has a general I-shaped cross-section.

6. The seat back panel of claim 5, wherein said I-shaped cross-section is formed from an inner mounting surface, a central flange portion and a base.

7. The seat back panel of claim 6, wherein said central flange portion extends generally transversely an inner mounting surface of said panel.

8. The seat back panel of claim 6, wherein said base has an angled interior edge portion to create a hook-like structure with said central flange portion.

9. The seat back panel of claim 1, wherein first and second side attachment members are located on opposite sides of said central portion.

10. The seat back panel of claim 1, wherein said at least one side attachment member and said upper attachment member are adapted to elastically selectively receive and secure said framework.

11. The seat back panel of claim 1, wherein said lower portion has wing portions that are located below said central portion, said wing portions having a greater width than said central portion.

12. The seat back panel of claim 1, wherein said panel is unitary, integrally formed and one piece.

13. A seat back panel, comprising:
    a panel having a central portion bounded by an upper portion and a lower portion,
    wherein said central portion has a least one side attachment member adapted to selectively receive a portion of said framework, said central portion having a concave shape,
    wherein said lower portion has a convex shape,
    wherein said concave shape and said convex shape give said panel a general S-shape,
    wherein said lower portion has wing portions that are located below said central portion, said wing portions having a greater width than said central portion.

14. A seat back panel, comprising:
    a panel having a central portion bounded by an upper portion and a lower portion,
    wherein said upper portion has an upper attachment member adapted to selectively receive a portion of a framework for a seat;
    wherein said central portion has a least one side attachment member adapted to selectively receive a portion of said framework, said central portion having a concave shape,
    wherein said lower portion has a convex shape,
    wherein said concave shape and said convex shape give said panel a general S-shape,
    wherein said upper attachment member has a mounting surface directly attached to an inner surface of said upper portion of said panel,
    wherein a flange extends generally transverse said mounting surface,
    wherein a first rear finger extends generally transversely from said flange, and a second forward finger extends generally transversely from said flange, wherein said first rear finger and said second forward finger are generally parallel one another,
    wherein said lower portion has wing portions that are located below said central portion, said wing portions having a greater width than said central portion.

* * * * *